United States Patent [19]

Perry et al.

[11] 4,433,867
[45] Feb. 28, 1984

[54] ROOF RAIL MOLDING MEMBER

[75] Inventors: William H. Perry, Rochester; David C. Stewart, Farmington Hills; Geoffrey Waterworth, Troy, all of Mich.

[73] Assignee: General Motors Corporation, Detroit, Mich.

[21] Appl. No.: 314,559

[22] Filed: Oct. 26, 1981

[51] Int. Cl.³ .............................................. B60J 5/04
[52] U.S. Cl. ..................................... 296/146; 52/716; 296/213
[58] Field of Search ................. 296/146, 93, 154, 213; 52/716; 49/372, 374, 485, 487

[56] References Cited

U.S. PATENT DOCUMENTS

| | | | |
|---|---|---|---|
| 3,974,606 | 8/1976 | La Borde | 52/716 |
| 4,266,824 | 5/1981 | Inamoto | 296/93 |
| 4,277,099 | 7/1981 | Klein et al. | 296/146 |

FOREIGN PATENT DOCUMENTS

| | | | |
|---|---|---|---|
| 55-119522 | 9/1980 | Japan | 296/213 |
| 56-86821 | 7/1981 | Japan | 296/93 |

Primary Examiner—Joseph F. Peters, Jr.
Assistant Examiner—Ross Weaver
Attorney, Agent, or Firm—Charles E. Leahy

[57] ABSTRACT

An extruded plastic molding is attached to the roof rail and faces downwardly toward the door opening so that the molding conceals the spot welds on the roof rail. The molding has an outboard edge portion defining a recess which is installed over the pinch-weld flange and accommodates a sealant to prevent the flow of moisture through the interface between the panels at the pinch-weld and between the roof rail and the molding. The outboard edge portion also defines an upwardly opening drip gutter and has an integral longitudinal extending retention lip structure by which a decorative drip molding may be snap-retained on the molding. The inboard edge of the molding overlaps a leg of the door sealing strip.

3 Claims, 2 Drawing Figures

ROOF RAIL MOLDING MEMBER

The invention relates to the roof rail construction of a motor vehicle body and more particularly provides an extruded plastic molding which conceals the roof rail, forms a drip gutter, provides snap retention for a drip molding, seals the pinch-weld flange, and overlaps a leg of the door sealing strip.

BACKGROUND OF THE INVENTION

Motor vehicle bodies typically have a roof rail construction comprised of outer and inner roof panels which are suitably attached to a longitudinal extending roof rail which defines the door opening. A pinch-weld flange extends longitudinally along the outer edge of the roof above the roof opening and defines an upwardly opening drip gutter. A decorative drip molding is secured along the outer edge of the roof above the door opening. A compressible sealing strip is suitably attached to the roof rail for sealing engagement by the door to provide a seal against the flow of moisture around the door and into the passenger compartment.

SUMMARY OF THE INVENTION

The present invention provides an extruded plastic molding which is attached to the roof rail and faces downwardly toward the door opening so that the molding conceals the spot welds on the roof rail. The molding has an outboard edge portion defining a recess which is installed over the pinch-weld flange connecting the roof rail with the roof outer panel and forms a cavity for containing a sealant to prevent the flow of moisture through the interface between the panels at the pinch weld and between the roof rail and the molding member. The outboard edge portion also forms an upwardly opening drip gutter and has an integral longitudinal extending retention lip structure by which a decorative drip molding may be snap retained on the molding. The inboard edge portion of the molding overlaps a leg of the compressible door sealing strip.

DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
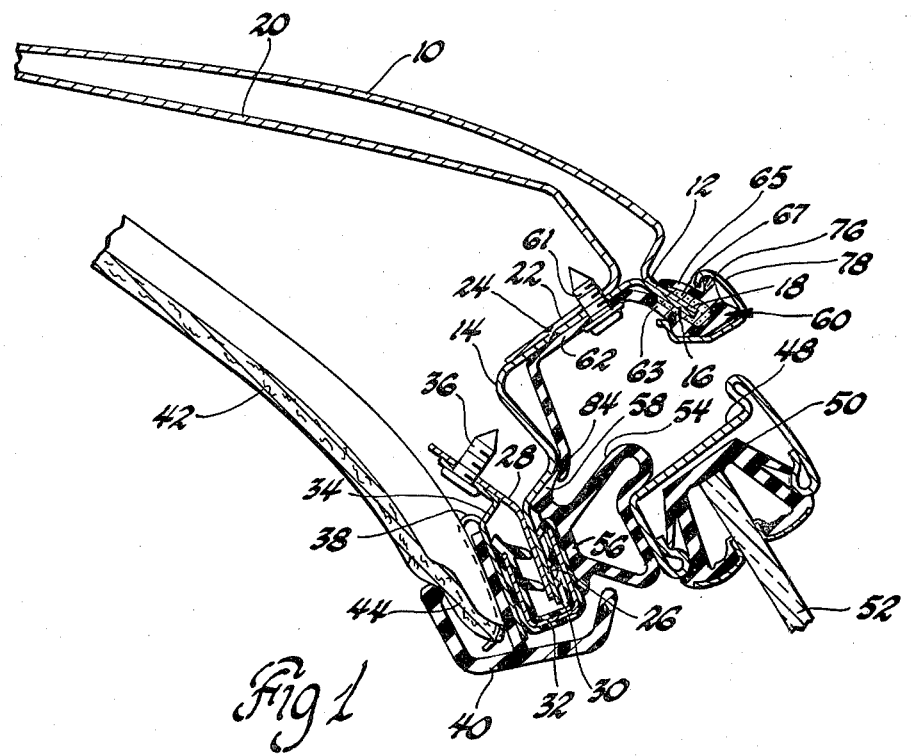
FIG. 1 is a sectional view taken through the roof rail construction of a vehicle body.

Referring to FIG. 1, there is shown a typical section through the roof rail construction of a motor vehicle. A roof outer panel 10 has an offset flange 12 at its outboard edge. A roof rail 14 has a flange 16 which is welded to the offset flange 12 of the roof outer panel 10 to cooperate therewith in defining a pinch-weld flange 18. A roof inner panel 20 has an inturned flange 22 which is spot-welded as shown at 24 along the length of the roof rail 14.

The inboard edge of the roof rail 14 includes a depending flange 26 which is welded to a reinforcement 28 to define a pinch-weld flange 30. A conventional channel shaped garnish molding 32 fits over the pinch-weld flange 30. A trim support 34 is attached to the reinforcement 28 by screws 36 and mounts a plurality of clips 38 which attach an extruded trim panel 40. A head-lining 42 is suitably attached to the vehicle roof and the roof rail construction and has its outboard edge 44 seated behind the trim panel 40.

The vehicle door has a window frame 48 which carries a window channel 50 for receiving and sealing the top edge of the door glass 52. A resilient compressible sealing strip 54 has a base wall 56 which is suitably attached to the garnish molding 32 or otherwise suitably attached to the roof rail construction inboard the window frame 48. The sealing strip 54 also has a continuous leg 58 which lies against the roof rail 14. When the door is closed as shown in FIG. 1, the window frame 48 seals against the sealing strip 54 to prevent the intrusion of moisture around the window frame and into the interior of the vehicle body.

Figure 2:
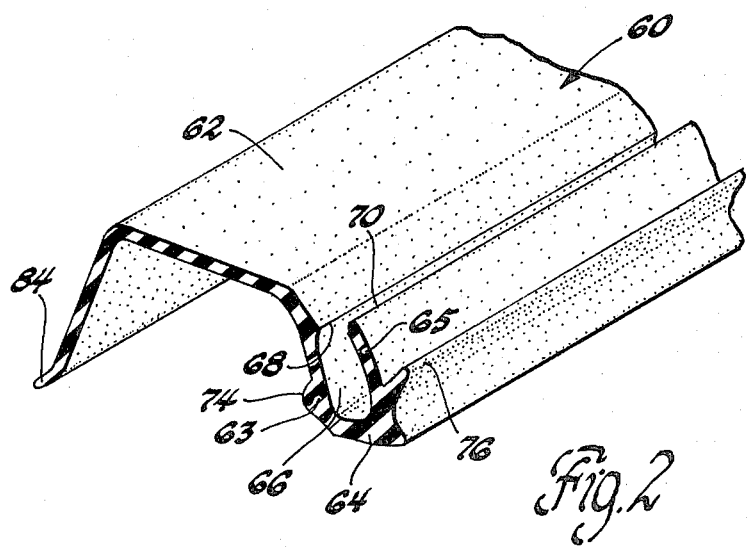
FIG. 2 is a perspective view showing a typical section through the extruded plastic molding member of this invention.

Referring to FIGS. 1 and 2, the molding 60 of this invention is preferably a plastic extrusion and includes a base wall 62 which is attached along the length of the roof rail 14 by a plurality of screws 61 so that the base wall 62 conceals the spot welds 24 from view.

The outboard edge portion 64 of the molding 60 has spaced apart walls 63 and 65 which define a recess 66 by which the molding is installed in concealing overlayment of the pinch-weld flange 18. The wall 63 has a ridge 68 which engages the roof rail flange 16 and the wall 65 has a ridge 70 which engages the offset flange 12 of the roof outer panel 10. As seen in FIG. 1, the recess 66 defines a cavity for retaining a curable liquid sealant 67 which fills the cavity. The sealant 67 is effective to prevent the flow of moisture through the interface between the offset flange 12 of the roof outer panel 10 and the flange 16 of the roof rail 14. The sealant also prevents the flow of moisture to the interface between the roof rail 14 and the molding 60.

The outboard edge portion 64 of the molding 60 also has an inboard lip 74 and an outboard lip 76 over which a channel-shaped decorative drip molding 78 is snap-retained. As seen in FIG. 1, the lip 76 and the wall 65 cooperate to define an upwardly opening drip gutter by which rain running off the outer roof panel 10 is diverted longitudinally instead of pouring down over the door opening.

The molding 60 also has an inboard edge portion 84 which overlaps the leg 58 of the sealing strip 54 to assure that the entire roof rail 14 is concealed from view. The overlap of the inboard edge portion 84 over the leg 58 also prevents the flow of moisture to the interface between the sealing strip leg 58 and the roof rail 14.

While the invention has been disclosed primarily in terms of the specific preferred embodiment shown in the drawing, it is not intended to be limited thereto, but rather only to the extent set forth in the claims. For example, the liquid sealant 67 may be replaced by a sealing tape which is adhesively secured to the outer faces of the offset flange 12 of the roof outer panel 10 and to the flange 16 of the roof rail 16. When such a tape is used as an alternative to the curable liquid sealant 67, the cavity defined by recess 66 accommodates the presence of the tape without distortion of the molding 60. Furthermore, it will be understood that it is within the state of the plastics manufacturing technology to provide a decorative drip molding integral with the molding 60. For example, a foil strip could be coextruded onto the outer face of the outer edge portion 64 of the molding 60. Accordingly, the longitudinal extending retention lip structure defined by the inboard lip 74 and the outboard lip 76 would be eliminated.

Thus, it is seen that the invention provides a new and improved roof rail construction in which an extruded plastic molding member conceals the roof rail, provides a drip gutter, provides snap retention for the drip rail molding, seals and conceals the pinch-weld flange, and overlaps the door sealing strip.

The embodiments of the invention in which an exclusive property or privilege is claimed are defined as follows:

1. A roof rail molding for a vehicle body having a roof rail extending longitudinally above a door opening and having a flange pinch-welded to a juxtaposed flange of the roof outer panel, and a resilient compressible sealing strip suitably secured to the vehicle body inboard of the door opening for sealing engagement by a hingedly mounted door and having a sealing leg for sealing engagement with the roof rail, said molding comprising:

a plastic molding attached to the roof rail and facing downwardly to define the top edge of the door opening, said molding having an outboard edge portion defining a recess by which the molding is installed over the pinch-weld flange and defining a sealant cavity, said molding further having an inboard edge portion adapted to continuously overlie a portion of the sealing strip leg.

2. A roof rail molding for a vehicle body having a roof rail extending longitudinally above a door opening and having a flange pinch-welded to a juxtaposed flange of the roof outer panel, and a resilient compressible sealing strip suitably secured to the vehicle body inboard of the door opening for sealing engagement by a door hingedly mounted for movement into closure of the door opening, said molding comprising:

an extruded plastic molding having a base adapted for attachment to the roof rail, said molding having an outboard edge portion defining a recess by which the molding is adapted for installation over the pinch-welded flange to conceal the flange from view inside and outside the vehicle body and for defining a cavity for containing a sealant to prevent the intrusion of moisture through the pinch-welded flange interface between the roof rail and the roof outer panel and between the roof rail and the molding, said outboard edge portion of the molding further defining a longitudinal extending retention lip structure by which a decorative molding may be retained on the molding, said molding further including an inboard edge portion adapted to overlap the sealing strip.

3. In a vehicle body having a roof rail extending longitudinally above a door opening and having a flange pinch-welded to a juxtaposed flange of the roof outer panel, the improvement comprising:

an extruded plastic molding having a base attached to the roof rail, an inboard edge portion, and an outboard edge portion, said outboard edge portion defining a recess receiving the pinch-welded flange to conceal the flange from view, a longitudinal extending retention lip structure and an upwardly opening drip gutter situated in water flow receiving relationship with the door outer panel, a sealant means concealed within the recess of the molding to prevent the intrusion of moisture through the pinch-welded flange interface between the roof rail and the roof outer panel and to prevent the intrusion of moisture between the roof rail and the molding;

a decorative molding mounted upon the longitudinal extending retention lip structure of the molding;

and a resilient compressible sealing strip suitably secured to the vehicle body inboard of the door opening for sealing engagement by a door, said sealing strip being overlapped by the inboard edge portion of the molding.

* * * * *